Oct. 2, 1962     A. G. DEARING     3,056,448
TIRE RETREADING MACHINE
Filed May 14, 1959     3 Sheets-Sheet 1
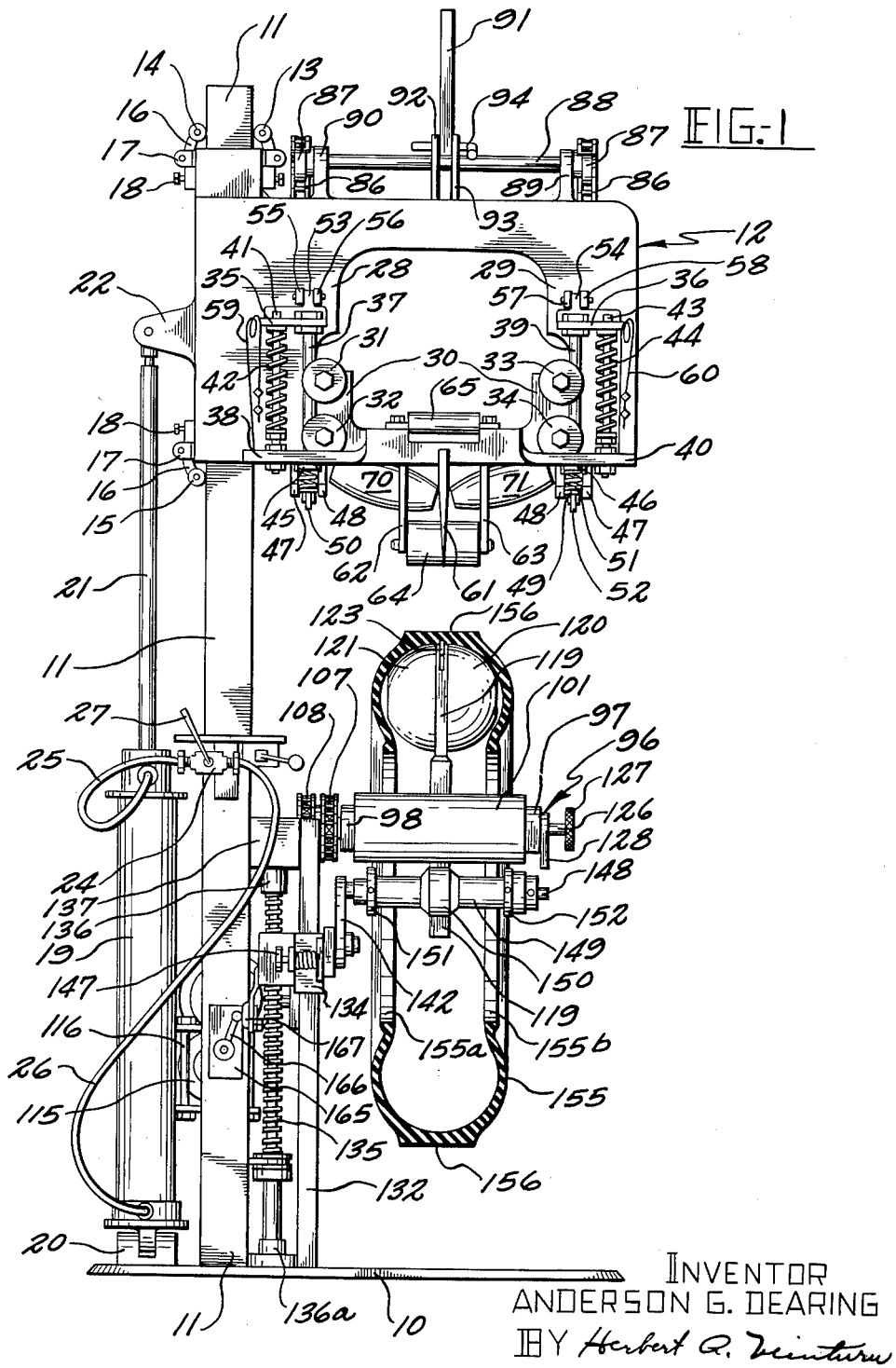
INVENTOR
ANDERSON G. DEARING
BY Herbert Q. Venturu
ATTORNEY

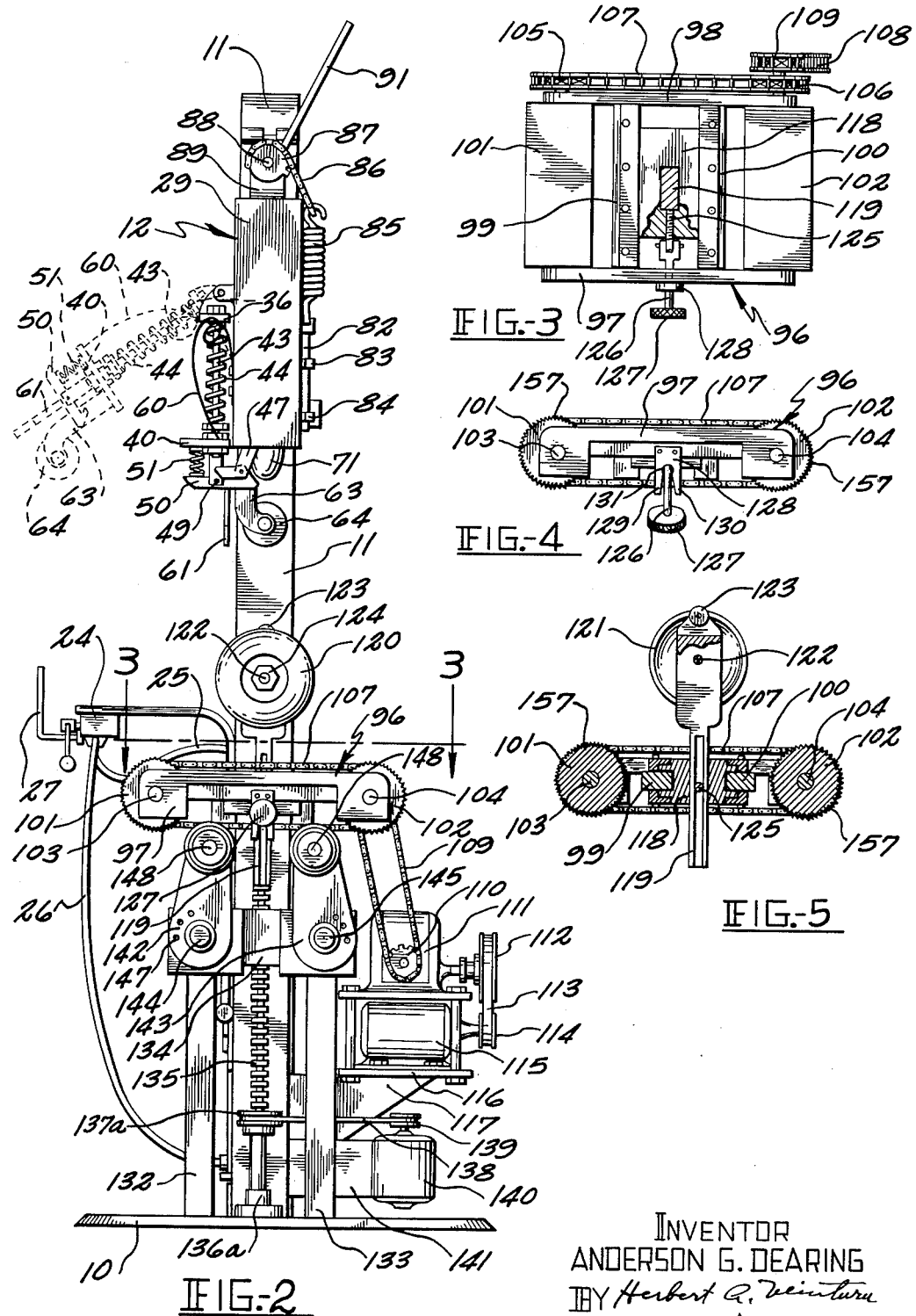

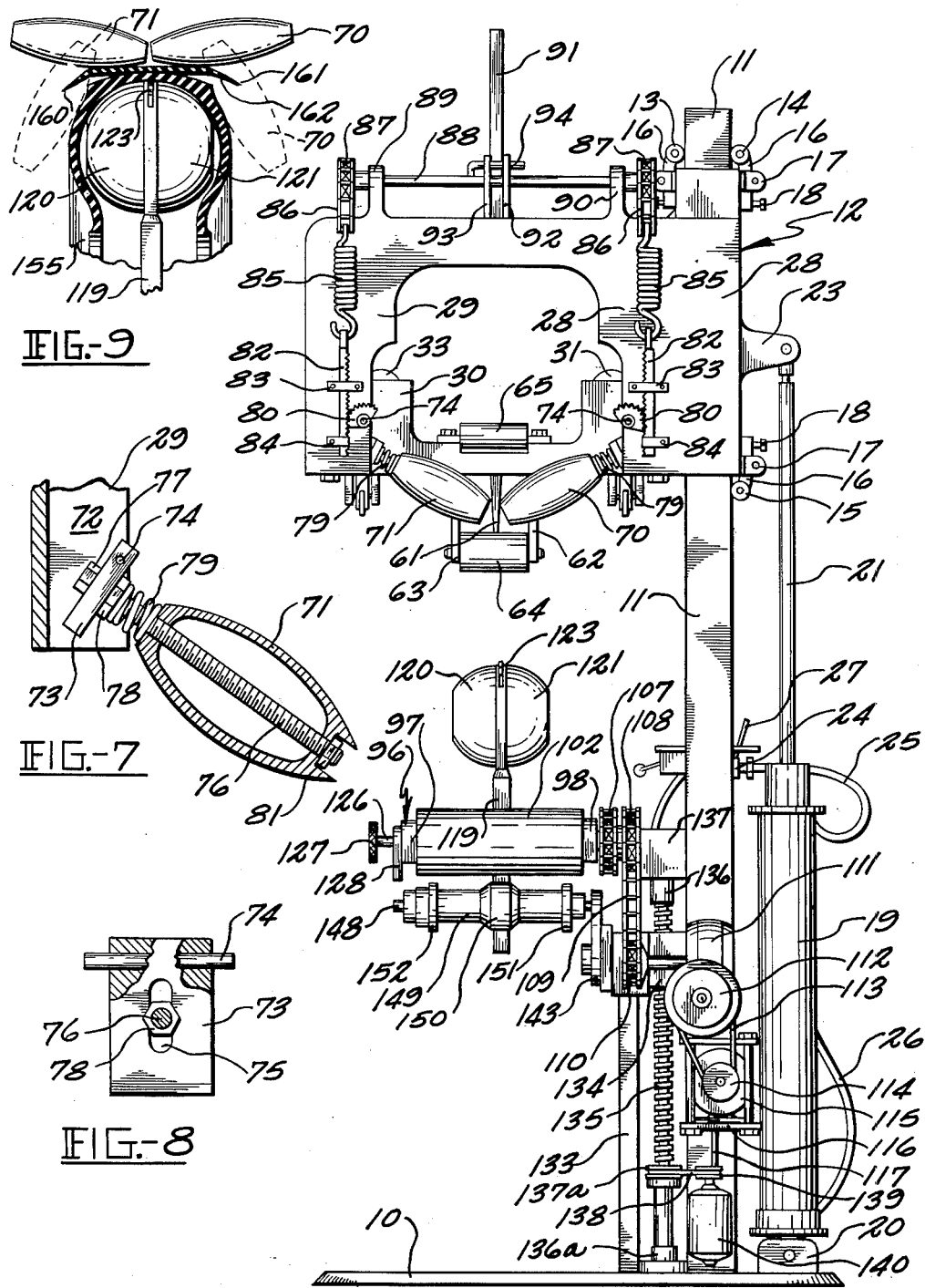

though the underside thereof, the latch bar 50 which is in the path of this bar 49, so that the end of the latch member 50 may engage therearound so as to retain the crosshead 30 between the legs 28 and

United States Patent Office 3,056,448
Patented Oct. 2, 1962

3,056,448
TIRE RETREADING MACHINE
Anderson G. Dearing, 1524 Slate Run Road,
New Albany, Ind.
Filed May 14, 1959, Ser. No. 813,156
1 Claim. (Cl. 156—411)

This invention relates to a machine for retreading vehicle tires including both passenger tires and truck tires. The machine will also handle top treading alone and full retreading which includes the tread proper plus shoulders adjacent the tread.

The machine is to be used to pressure roll on the usual camel back including the usual width for the specific sized tire for tread only, and a camel back with side beveled edges for rolling across the tread and down onto the shoulder portions of the tire. Following the application of the camel back, then the tire is removed from this particular machine constituting the subject matter of the present invention and taken to be vulcanized. It is to be understood in the following description that the tire has been prepared by removing the old tread and with sufficient buffing for application of the new, raw rubber camel back. A unique feature of the invention resides in the automatic rocking of full retreading rollers which will automatically roll the tread portion properly and continue on down around and over the shoulders with full and adequate pressure thereagainst. Other unique features of the invention reside in the provision of a structure permitting the easy "loading" thereof with either truck or passenger tires; a positive drive for rotation of the tire while the tread is being fed thereon; and many other mechanical features all contributing to a time and labor saving operation with the minimum amount of physical labor having to be supplied by the operator.

These and many other objects and advantages of the invention will become apparent in the following description in the one particular form of the invention as illustrated in the accompanying drawings, in which FIG. 1 is a view in front elevation of a structure embodying the invention including a sectional view of a tire carried thereby;

FIG. 2 is a view in side elevation of the machine;

FIG. 3 is a detail in section taken on the line 3—3 in FIG. 2;

FIG. 4 is a detail in front elevation of tire rotating elements;

FIG. 5 is a detail in vertical section including the tire support and rotating means;

FIG. 6 is a view in reverse side elevation as compared to that shown in FIG. 1;

FIG. 7 is a view on an enlarged scale in detail and in vertical section of a rockable pressure roller;

FIG. 8 is a detail in partial section of a pressure roller carrier; and

FIG. 9 is a detail in transverse section relative to a tire illustrating the travel of the pressure rollers.

Referring initially to FIGS. 1, 2 and 6, there is a base 10 consisting essentially of a flat metal platform. A post 11 is vertically supported by the base 10 and fixed thereto toward the left hand edge portion (using FIG. 1). This post 11 will extend upwardly from the base 10 a distance in the order of at least five feet. In the form herein shown, the post 11 is rectangular in cross-section.

A head generally designated by the numeral 12 is shiftably mounted on the post 11 to be carried upwardly and downwardly therealong. This head 12 overhangs the base 10 and is fixed against horizontal travel by reason of having the post 11 extend through the rear portion thereof. To permit easy traversing of the post 11, the head 12 is loosely fitted about the post 11, and carries bearing rollers 13, 14 at the upper end of the head, and disposed on opposite sides of the post 11, and a third bearing roller 15 carried at the lower end of the head on the back side of the post 11, FIG. 6. These rollers 13, 14, and 15 are mounted on arms 16 rockably carried by ears 17 carried by the head 12, and are adjustably positioned to ride in contact with the opposite faces of the post 11 by means of an adjusting screw 18 in each arm 16 passing through that arm on the opposite side of the ears 17 from the roller so as to bear against the head itself.

A cylinder 19 is rockably mounted on the base 10 through a bracket 20. This cylinder may be either an air cylinder or an oil carrying cylinder, the primary requirement being that it will advance and retract a piston rod 21 which is rockably interconnected to the head 12 by means of the ears 22 and 23. The medium for advancing and retracting the piston 21 is interconnected with a control valve 24 mounted on the post 11 as indicated in FIG. 1. From this valve 24, leads a hose 25 interconnecting with the top end of the cylinder 19, and a second hose 26 interconnecting with the lower end of the cylinder 19. Thus by manipulating the valve 24 through the control handle 27 the rod 21 and in turn the head 12 may be raised and lowered along the post 11.

The head 12, in the extending portion from the post 11, is generally, inverted U-shaped. This provides in effect a leg 28 through which the post 11 extends, and an outwardly down turned leg 29. A crosshead 30 is slidably guided vertically between these two legs 28 and 29. The crosshead 30 is freely fitted between the two legs so that it may be readily removed or rocked from therebetween when so desired as will be further explained. The crosshead 30 carries in vertical alignment a pair of peripherally grooved rollers 31 and 32 on one side, and a second pair of peripherally grooved pulleys or rollers 33 and 34 on the other side. A pair of brackets 35 and 36 are rockably interconnected with the legs 28 and 29 respectively toward upper ends thereof. A rod or post 37 is fixed to the bracket 35 and extends vertically downwardly through a foot 38 carried by the crosshead 30, and turned outwardly across the side of the leg 28. The post 37 while fixed to the bracket 35 is slidingly carried through the foot or bracket 38.

In like manner, a rod 39 is fixed to the bracket 36 and extends downwardly vertically and slidingly through a foot 40 turned horizontally from the crosshead 30. The rod 37 enters the grooves about the pulleys 31 and 32, and the rod 39 fits across the grooves of the pulleys 33 and 34. In this manner, the crosshead 30 may be shifted vertically and in guiding relation by means of the engagement of the pulleys 31, 32 with the rod 37 and the pulleys 33, 34 with the rod 39.

A spring guide rod 41 is fixed to the foot 38 and extends upwardly through a coil spring 42 and slidingly passes through the bracket 35. A spring guide 43 is fixed to the bracket 40 and extends upwardly through a coil spring 44 and slidingly through the bracket 36. These springs 42 and 44 thus urge the crosshead 30 downwardly, and this downward limit of travel under influence of the springs 42 and 44 controlled by heads 45 and 46 respectively on the lower ends of the rods 37 and 39 under the feet 38 and 40. The crosshead 30 is therefore shiftable upwardly from this lowermost position as determined by these heads 45 and 46, against the yielding pressures of the springs 42 and 44.

A pair of arms 47 and 48 are carried by the head leg 28 and are directed downwardly and forwardly in spaced apart relation and carry a bar or rod 49 therebetween. The bracket 38 has suspended thereunder a rockable latch bar 50 which is in the path of this bar 49, so that the end of the latch member 50 may engage therearound so as to retain the crosshead 30 between the legs 28 and 29. A spring 51 normally urges the latch bar 50 into engagement with the bar 49. This same latching arrangement is provided in reference to the underside of the leg 29 where the latch bar 52 is carried in the same manner, the mechanism being duplicated, and therefore not being described further.

By pushing upwardly on these latch bars 50 and 52, the crosshead 30 may be pulled forwardly from between the legs 28 and 29, through a hinge arrangement with those legs. This hinge arrangement consists of an upturned finger 53 on the one side extending from the bracket 35, and a finger 54 upturned from the bracket 36 on the other side. These fingers are respectively rockably suspended from pairs of ears 55, 56 on the leg 28, and ears 57 and 58 carried on the leg 29. To aid in swinging the crosshead 30 forwardly, a pair of springs 59 and 60 somewhat in the nature of hairpin springs are fixed respectively by corresponding arms to the legs 28 and 29 and by other arms to the brackets 38 and 40. These springs 59 and 60 are sufficient to hold the head 30 in the forwardly, inclined position, as indicated by the dash lines in FIG. 2.

A pointer or indicator 61 is fixed centrally of the crosshead 30 to extend downwardly to be employed as the center indicating device. To the rear of this pointer 61, a pair of arms 62 and 63 hang downwardly in fixed manner from the crosshead 30 in spaced apart relation, and carry therebetween a pressure roller 64. A riding roller 65 is rotatably mounted across the upper side of the crosshead 30. Both the rollers 64 and 65 are free to rotate on a fixed axis in each instance. That is, the axis is fixed in relation to the cross head 30.

The legs 28 and 29 each carries a pressure roller 70 and 71 respectively rockably supported by the roller ends of the legs 28 and 29, and confined to vertical rocking. Each of these pressure rollers 70 and 71 is identical in shape and in mounting, and therefore but one mounting is described particularly in reference to FIGS. 7 and 8. Within a lower portion of the leg 29, in a recess 72 therein, is rockably mounted a block 73. The block 73 carries a pin 74 extending from a side edge portion thereof in each instance to be rotatably fixed to the leg 29. This block 73 normally hangs downwardly from the pin 74, and carries a central, vertically aligned slot 75 therethrough.

A shaft 76 extends through the slot 75 and is adjustably fixed therealong by means of an end nut 77 and a lock nut 78, on opposing faces of the block 73. The shaft 76 carries a short coil spring 79 therearound abutting by one end against the nut 78, and by the other end against the end of the generally elliptical roller 71 through which the shaft 76 axially extends. The roller 71 is free to rotate on the shaft 76, and is retained thereon by a nut 81 at its outer end. Thus, not only can the roller 71 rotate, but it also can be shifted axially of the shaft 76 against the yielding resistance of the spring 79 normally retaining the roller 71 seated against the nut 81.

The pin 74 extends through the back face of the leg 29, FIG. 6, and has fixed thereon outside of the leg a gear quadrant 80. This quadrant 80 is in constant mesh with a rack bar 82 vertically guided by an upper and lower bracket 83 and 84 respectively. This rack bar 82 is normally pulled upwardly by means of a spring 85 which is hooked in the upper end of the bar, by its lower end, and is hooked by its upper end into a length of a chain 86. This chain 86 extends over a sprocket wheel 87, FIG. 2, mounted on a transversely extending shaft 88. This shaft 88 is supported across the topside of the head 12 by means of the upturned bearings 89 and 90, FIG. 1. A lever 91 is fixed approximately centrally of the shaft 88 as a means of rocking the shaft 88 by hand. The shaft 88 passes through a pair of spaced apart, upturned legs 92 and 93 which are fixed to the topside of the head 12. A removable pin 94 may be passed through the upper ends of these members 92 and 93 as a means of forming an abutment against which the lever 91 may bear to limit the turning of the shaft 88 in a rearward direction. The springs 85 normally retain the rollers 70 and 71 in a lowermost position as indicated in FIGS. 1, 2, and 6.

A skeleton table generally designated by the numeral 96 extends horizontally from the post 11 and is fixed thereto. This table 96 consists essentially of a front cross bar 97 and a rear cross bar 98 tied together by fore and aft, spaced apart bars 99 and 100. Between the outer ends of the bars 97 and 98 are respectively rollers 101 and 102 rotatably carried therebetween, on shafts 103 and 104. The rear ends of these shafts 103 and 104 extend through the rear bar 98 and each carries a sprocket wheel 105 and 106 respectively around which are wrapped a continuous chain 107.

The shaft 104 extends through the sprocket 106 and carries a second sprocket 108 fixed thereon. A drive chain 109 is carried around the sprocket 108 and downwardly around a sprocket 110 which is carried by a reduction gear box 111. The box 111 carries a driven pulley 112 from around which extends a belt 113 to a motor pulley 114 in turn carried by an electric motor 115. This motor 115 is mounted in a frame 116 carried on a bracket 117 fixed to the right hand side of the post 11, FIG. 2.

The table 96 carries a slide 118 confined to fore and aft travel of bars 99 and 100 fixed by their ends to the bars 97 and 98. A standard 119 is slidingly guided in vertical directions approximately centrally through the slide 118. The upper end of the standard 119 is widened in a fore and aft direction to receive respectively on its sides the hemispherical cups 120 and 121, FIGS. 1, 2 and 5, these cups being free to rotate about a shaft 122 carried by the standard 119. Preferably the upper end of the standard 119 is bifurcated to receive and carry a small roller 123 to extend slightly above the uppermost portions of the cups 120 and 121. These cups 120 and 121 are retained on the shaft 122 by any suitable means, herein shown as by a nut 124 screw-threadedly engaging the shaft 122.

The standard 119 is adjustably carried by the slide 118. A screw 125 screw-threadedly enters the forward end of the slide 118 and continues therethrough until it strikes a forward side of the standard 119, FIG. 3. A shaft 126 is hingedly connected to the forward end of the screw 125, and extends forwardly of the bar 97, to carry a wheel 127 on its forward end as a means for rotating the screw 125 into and out of engagement with the standard 119 so that the standard may be lifted or lowered and secured in desired elevations thereby. When the screw 125 is turned to the proper degree of rotation, the shaft 126 may be rocked in a vertical plane. The shaft 126 normally extends through a slotted plate 128 fixed to the table 96 on the front side, the slotted portion of the plate 128 being directed downwardly and opening out from the under edge. The plate thus has side tongues 129 and 130 depending. The inner edges of these tongues 129 and 130 are beveled so that the shaft 126 may be guided therebetween to spring into an upper end of the slot which is approximately the same diameter as that of the shaft 126, so that by yieldingly spreading apart the tongues 129 and 130, the shaft 126 may spring into that opening 131 and be yieldingly retained therethrough.

When the shaft 126 is in its upper position in axial alignment by the screw 125, the wheel 127 may be rotated to disengage or engage the end of the screw with the standard 119. When it is desired to shift the standard 119 in the fore and aft direction, this may be accomplished quickly by dropping the shaft 126 out of a bracket 128, pushing the slide in the direction desired and then pulling the shaft 126 back upwardly into plate engagement.

A pair of spaced apart posts as guides and carrying the numerals 132 and 133 respectively, FIG. 2, are fixed by the lower ends to the base plate 10 to extend rigidly upwardly therefrom and in spaced apart relation. The upper ends are also rigidly held by members (not shown) engaging the post 11. The essential function of these guides 132, 133 is to serve as guides for a cross member 134 which is slidingly guided along these posts 132 and 133 in vertical travel. The slide 134 is not only guided by these guides 132 and 133, but extends rearwardly to receive vertically therethrough a screw shaft 135 which is guided by its upper end by a bearing 136 carried on the underside of the table carrying member 137 which is fixed to the post 11, FIG. 6. The lower end of the screw shaft 135 is carried in a bearing 136a in turn fixed to the base 10. A drive pulley 137a is fixed on a lower portion of the screw shaft 135, and a belt 138 surrounds the pulley 137a and a driving pulley 139 carried by a motor 140. The motor 140 is carried by a bracket 141 in turn fixed to the post 11.

On the front side of the cross member 134 are fixed rockably two arms 142 and 143. These arms rock on shafts 144 and 145 respectively. Each arm 142 and 143 carries a plurality of holes 146 therethrough on the arc of a circle which center is that of the shaft 144 and 145. A pin 147 is carried on each end of the cross member 134 to be in the path of these holes 146 upon rocking of the arms 142 and 143. Preferably the pin 147 is spring pressed to enter the holes as may be desired in the degree of rocking of the arms. The outer free ends of each of these arms 142 and 143 carries a shaft 148 which in turn rotatably carries a roller 149. The central portion of the roller 149 has an enlarged diameter portion 150. A collar 151 is revolubly carried by the roller 149 at the rear end portion thereof on one side of the portion 150, and a second collar 152 is revolubly carried on an outer end portion of the roller 149. These collars 151 and 152 may be shifted axially of the roller 149 and fixed in selected positions therealong. As indicated in the drawings, there is no forward or outboard bearing for the shafts 148.

These rollers 149 may thus be raised and lowered by turning of the screw shaft 135 operated by the motor 140.

*Operation*

Assuming that a passenger car tire is to be retreaded (tread only and not a full retreading), reference is made to FIG. 1 primarily wherein a tire generally designated by the numeral 155 is dropped over the cups 120 and 121 wherein the full inner area under the tread area 156 extends across the upper surface portions of the cups 120 and 121. The tread area 156 has been completely previously prepared for receiving the new tread before the tire 155 is thus positioned over the cups 120 and 121. Since there are no outboard bearings on either the table 96 or the rollers 149, the tire is readily positioned on these cups.

The screw shaft 135 is then revolved by energizing the motor 140. This motor 140 is a reversible type motor and may be operated to turn the shaft 135 either clockwise or counterclockwise. In this instance, the shaft 135 is turned to lower the cross member 134 to bring the rollers 149 downwardly and snugly against the peripheral edges 155a and 155b of the tire 155. In so doing, other portions of these peripheral edges are compressibly engaged around the outer portions of the rollers 101 and 102. The rollers 149 will of course previously have been adjusted as to rocking toward and away from each other to engage the peripheral bead edges so as to maintain the tire in its approximate circular form as the upper peripheral edges of the beads are compressed against the rollers 101 and 102.

These rollers 101 and 102 are shallow grooved longitudinally thereof in each instance to provide sharpened ribs 157 extending longitudinally of these rollers in each instance. These ribs 157 grip the peripheral edges of the beads so that as the rollers are turned simultaneously by the motor 115 when it is energized, the entire tire will be slowly revolved around the cups 120 and 121.

An end portion of a length of camel back (not shown) is pressed downwardly on top of the tread area 156, and then the head 12 is lowered by manipulating the valve control lever 27 to bring the pressure roller 64 down against the camel back with a pressure exerted against the camel back of from 30 to 40 pounds normally, or as may be varied as those skilled in the art may require. The camel back is held by hand as the operator allows the tire 155 to be revolved, under the driving of these rollers 101 and 102 until the camel back is completely fed around the entire circumference, cut off and the proper joint between ends made. From this simple capping or retreading, the tire is then ready to be taken off by first driving the screw shaft 135 in the position to carry the rollers 149 upwardly. The tire then goes to the vulcanizing process.

Truck tires are much heavier and normally larger in diameter than are passenger car tires. The machine of this invention is very well adapted to provide for the full retreading of a truck tire if that is desired, or for a simple recapping of the tread. Assuming that the truck tire is to be fully retreaded, the truck tire is dropped over the cups 120 and 121 as before, and pulled snugly against the driving rollers 101 and 102 by suitable adjustment of the rollers 149. The collars 151 and 152 are either spread apart from the centrally large portion 150 or brought theretoward, so as to be in close proximity to the outer faces of the beads of the tire. This prevents the tire from traveling out of its plane of revolution. The same thing of course is had in connection with the passenger car tire above described. The enlarged portion 150 prevents the beads from traveling too closely one toward the other.

It may be necessary to adjust the standard 119 to bring the tire at a desired elevation so that it will properly ride around the rollers 101 and 102 for the best driving effect. This of course is done prior to the dropping of the rollers 149 against the peripheral portions of the beads. The cross head 30 is released from its normal position between the legs 28 and 29 by disengaging the latches 50 and 52 as above described, and shifted to the left as viewed in FIG. 2. This removes the roller 64 from possible contact and bearing against the tire. The roller 65 is provided, particularly in repairing a large diameter tire so as to hold the cross head 30 out of contact with the tire by allowing this roller 65 to ride on the tire itself.

The slide 118 is properly adjusted in reference to the indicator 61 so that the cups 120 and 121 will be centered in relation to the enlarged portion 150 on the roller 149.

Then when the tire 155 is revolved as above described, the camel back is placed on the tread area and allowed to come thereagainst as the tire turns. The cylinder 19 is brought into operation to pull the rod 21 down, and thus lower the head 12, to bring the elliptical rollers 70 and 71 into contact with the camel back as indicated in FIG. 9 in a more or less diagrammatic illustration. These two rollers will abut one another as they are brought into their horizontal positions by continued lowering of the head 12, and then this head 12 is further lowered progressively to bring the rollers around into final positions indicated by the dash lines so that the outer marginal edges 160 and 161 of the camel back 162 are firmly brought against the shoulders of the tire 155 on each side of the tread area 156. This travel of the rollers 70 and 71 is brought about by the peculiar mounting of these rollers on the blocks 73. For large truck tires, the shaft 76 will be dropped and secured in the lower portion of the plot 75 in each instance. As the head 12 lowers, the blocks 73 by their roller end portions will rock toward the tire, and thus permit the rocking of the rollers as indicated in the diagram of FIG. 9. When the entire circumferential travel of the tire is had, then the valve lever 27 will be shifted to cause the rod 21 to be extended, and thereby lift the head 12 and carry the rollers 70 and 71 back up to the positions as indicated in FIG. 1. The spring 79 on the roller shaft 76 permits retraction of the rollers one from the other as the shafts 76 assume their horizontal positions, and yet maintain full bearing pressure on the camel back 162 centrally thereof.

The small roller 123 which is mounted in the upper end of the standard 119 is but slightly extended above the adjacent surfaces of these cups so that particularly in passenger car tire retreading when the roller 64 comes down with its pressure, the primary backing up pressure is taken by this roller 123 rather than taking that pressure on the cups 120 and 121. However there will be considerable pressure exerted on these cups 120 and 121 in a vertical downward direction, but the presence of the roller 123 serves as a safety factor.

The rollers 70 and 71 are maintained in increasing pressure against the retreading material as the head 12 lowers by reason of the upward rocking of the rollers 70 and 71 being against increasing tensioning of the springs 85. This induces a full pressure against the outwardly extending side edge portions 160 and 161 of the camel back so as to secure a firm bonding between those portions and the shoulders of the tire adjacent the tread area.

In order to limit the up travel of the rollers 149, a limit switch 165 is fixedly mounted on the post 11 to have a switch actuating arm 166 extend into the path of a foot 167 which is carried by the cross member 134. The arm 166 is shifted by the foot 167 travelling thereagainst to actuate the switch 165 to an open position. A circuit (not shown) is provided for closing the switch upon downward travel of the member 134.

While I have described my invention in this one particular form in minute detail, it is obvious that structural changes may be employed without departing from the spirit of the invention, and I do not desire to be limited to that precise form beyond the limitations which may be imposed by the following claim.

I claim:

In a machine applying camelback to a tire;

a pair of elliptical, camelback pressing rollers;

a roller carrying head;

a shaft for each roller and around which the roller rotates;

a member rotatably carried on each side of said head;

pivot means rockably carried by said head and confining said shafts to up and down rocking in a common plane, said shafts extending from said members by free ends;

said shafts being carried by said members on axes offset and approximately at right angles to the rocking axes of the members;

a gear member rockable by rocking of each of said members;

gear means engaging each of said gear members;

and means biasing said rotatable members and their attached shafts directing the free ends of the shafts one toward the other.

References Cited in the file of this patent

UNITED STATES PATENTS

| | | |
|---|---|---|
| 1,686,043 | Stevens | Oct. 2, 1928 |
| 1,996,129 | Thurman | Apr. 2, 1935 |
| 2,381,379 | Stevens | Aug. 7, 1945 |
| 2,717,022 | Duerksen | Sept. 6, 1955 |
| 2,729,269 | Antraigue | Jan. 3, 1956 |
| 2,734,553 | Rawls | Feb. 14, 1956 |
| 2,808,872 | Clapp | Oct. 8, 1957 |
| 2,915,108 | Antraigue | Dec. 1, 1959 |
| 2,971,563 | Cahill | Feb. 14, 1961 |